United States Patent
Kawamoto et al.

(10) Patent No.: US 10,346,046 B2
(45) Date of Patent: Jul. 9, 2019

(54) NON-TRANSITORY COMPUTER-READABLE STORAGE MEDIUM WITH EXECUTABLE INFORMATION PROCESSING PROGRAM STORED THEREON, INFORMATION PROCESSING APPARATUS, INFORMATION PROCESSING SYSTEM, AND INFORMATION PROCESSING METHOD

(71) Applicant: NINTENDO CO., LTD., Kyoto-shi, Kyoto (JP)

(72) Inventors: Kouichi Kawamoto, Kyoto (JP); Eiji Tokunaga, Kyoto (JP); Masaaki Sugino, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 89 days.

(21) Appl. No.: 15/626,376

(22) Filed: Jun. 19, 2017

(65) Prior Publication Data

US 2018/0107403 A1   Apr. 19, 2018

(30) Foreign Application Priority Data

Oct. 13, 2016   (JP) ................................ 2016-201658

(51) Int. Cl.
  *G06F 3/06*   (2006.01)
(52) U.S. Cl.
  CPC ............ *G06F 3/0608* (2013.01); *G06F 3/067* (2013.01); *G06F 3/0652* (2013.01)
(58) Field of Classification Search
  CPC ....... G06F 3/067; G06F 3/0608; G06F 3/0652
  USPC ........................................................ 711/166
  See application file for complete search history.

(56) References Cited

U.S. PATENT DOCUMENTS

| | | | | |
|---|---|---|---|---|
| 9,747,057 | B1* | 8/2017 | Ramani | G06F 3/0652 |
| 2002/0128068 | A1* | 9/2002 | Randall Whitten | A63F 13/10 |
| | | | | 463/43 |
| 2003/0097596 | A1* | 5/2003 | Muratov | G06F 21/31 |
| | | | | 726/26 |
| 2005/0039071 | A1* | 2/2005 | Sachs | G06F 9/4411 |
| | | | | 714/6.32 |
| 2009/0228823 | A1* | 9/2009 | Edwards | G06F 3/0605 |
| | | | | 715/772 |
| 2010/0074590 | A1* | 3/2010 | Momosaki | G11B 27/034 |
| | | | | 386/278 |

FOREIGN PATENT DOCUMENTS

JP   2013-099557   5/2013

OTHER PUBLICATIONS

Sugino, U.S. Appl. No. 15/626,434, filed Jun. 19, 2017 (50 pages).
(Continued)

*Primary Examiner* — Hiep T Nguyen
(74) *Attorney, Agent, or Firm* — Xsensus LLP

(57) ABSTRACT

An exemplary embodiment provides a non-transitory computer-readable storage medium with an executable information processing program stored thereon. The executable information processing program causes a computer of an information processing apparatus having a storage that stores a plurality of contents to perform designating an amount of data, selecting at least one content from among the plurality of contents based on the designated amount of data, and erasing the selected content from the storage in response to an operation by a user.

21 Claims, 13 Drawing Sheets

(56) References Cited

OTHER PUBLICATIONS

U.S. Appl. No. 15/626,434, filed Jun. 19, 2017, Non-Transitory Computer-Readable Storage Medium With Executable Information Processing Program Stored Thereon, Information Processing Apparatus, Information Processing System, and Information Processing Method.

U.S. Appl. No. 15/626,376, filed Jun. 19, 2017, Non-Transitory Computer-Readable Storage Medium With Executable Information Processing Program Stored Thereon, Information Processing Apparatus, Information Processing System, and Information Processing Method.

\* cited by examiner

FIG.8

| No. | NAME | 1112 {INTERNAL STORAGE | EXTERNAL STORAGE} | THE NUMBER OF TIMES OF LAUNCH | TIME AND DATE OF LAST LAUNCH | TOTAL TIME PERIOD OF EXECUTION | EXCLUSION |
|---|---|---|---|---|---|---|---|
| 1 | ACTION GAME AAA | 102M | 50M | 25 | 2016/2/5 14:00 | 524 | |
| 2 | CAR RACE AAA | 56M | 0M | 152 | 2016/3/4 15:32 | 156 | |
| 3 | ACTION GAME BBB | 150M | 52M | 35 | 2015/10/25 10:25 | 354 | |
| 4 | ADVENTURE GAME AAA | 78M | 20M | 38 | 2016/5/7 13:50 | 524 | |
| 5 | ADVENTURE GAME BBB | 80M | 10M | 28 | 2016/1/8 20:20 | 425 | 1 |
| 6 | ADVENTURE GAME CCC | 87M | 0M | 15 | 2016/8/30 18:15 | 205 | |
| ... | ... | ... | ... | ... | ... | ... | ... |

1111　1112　1113　1114　1115　1116

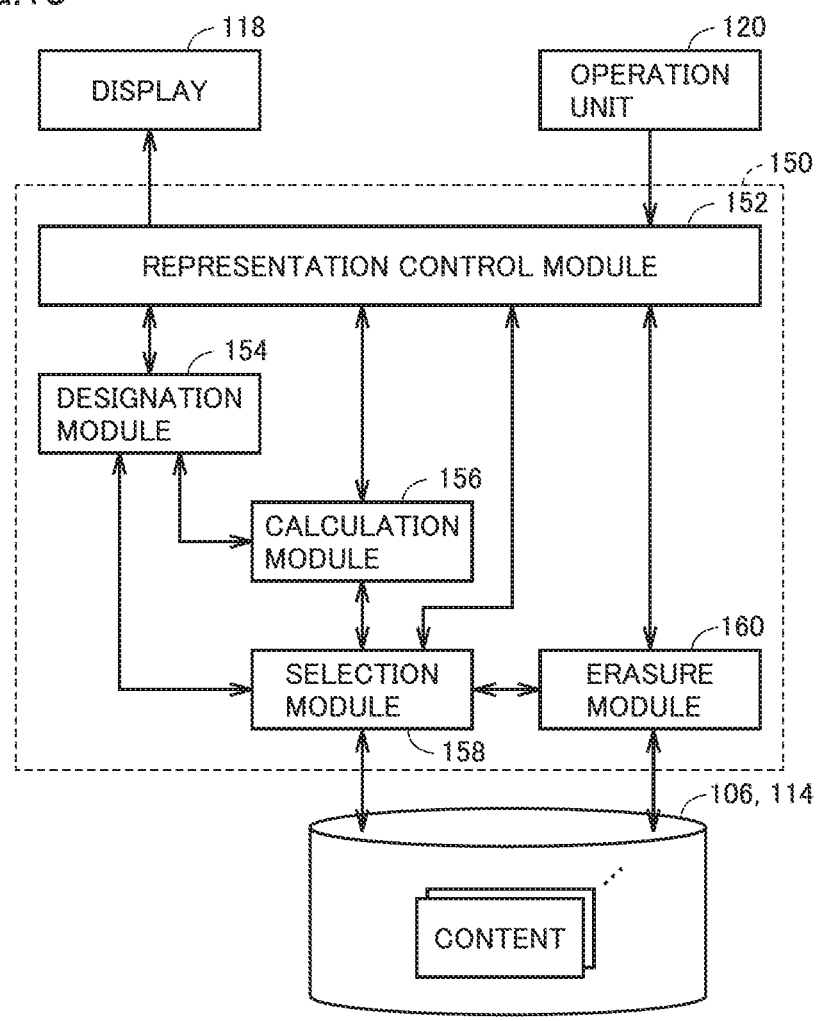

NON-TRANSITORY COMPUTER-READABLE STORAGE MEDIUM WITH EXECUTABLE INFORMATION PROCESSING PROGRAM STORED THEREON, INFORMATION PROCESSING APPARATUS, INFORMATION PROCESSING SYSTEM, AND INFORMATION PROCESSING METHOD

This nonprovisional application is based on Japanese Patent Application No. 2016-201658 filed with the Japan Patent Office on Oct. 13, 2016, the entire contents of which are hereby incorporated by reference.

FIELD

The present technology relates to a non-transitory computer-readable storage medium with an executable information processing program stored thereon, an information processing apparatus, an information processing system, and an information processing method.

BACKGROUND AND SUMMARY

A form of use of any application program by downloading the same has become general. An electronic device which stores a plurality of application programs in a memory has been known.

In the electronic device as described above, for example, in order to download a new application program, a free space may have to be secured. In such a case, application programs in a storage should be erased one by one until a necessary free space can be secured.

An exemplary embodiment provides a configuration which can facilitate an operation for securing a necessary free space in storing any content in a storage.

An exemplary embodiment provides a non-transitory computer-readable storage medium with an executable information processing program stored thereon. The information processing program, when executed by a computer of an information processing apparatus having a storage that stores a plurality of contents, causes the computer to perform designating an amount of data, selecting at least one content from among the plurality of contents based on the designated amount of data, and erasing the selected content from the storage in response to an operation by a user.

The step of selecting at least one content may include selecting the at least one content based on the designated amount of data and an amount of data of each content.

The step of selecting at least one content may include successively selecting contents from among the plurality of contents until a total amount of data of the selected contents reaches the designated amount of data.

The step of designating an amount of data may be based on an amount of data of a content to newly be stored and a current free space in the storage.

The step of designating an amount of data may designate an amount of data of a content of which downloading from a server which is capable of connecting to the information processing apparatus has been requested.

The step of designating an amount of data may include selecting the at least one content based on an amount of data of a content to newly be stored, a current free space in the storage, and an amount of data of each content.

The step of selecting at least one content may include setting a priority of the plurality of contents and selecting the at least one content in accordance with the set priority.

The step of selecting at least one content may include setting the priority based on a state of use of each content.

The step of selecting at least one content may include setting in advance an exclusion content to be excluded from erasure targets among the plurality of contents in response to an operation by a user and selecting a content to be erased from among contents other than the exclusion content among the plurality of contents.

The content may include an application program.

The storage may store corresponding application-associated data for each application program.

The step of erasing the selected content may exclude the application-associated data corresponding to the application program included in the selected content from erasure targets.

The storage may store corresponding setting information for each downloaded application program. The step of erasing the selected content may exclude the setting information corresponding to the application program included in the selected content from the erasure targets.

The executable information processing program may further cause the computer to perform showing an icon corresponding to an application program once stored in the storage and executing the corresponding application program in response to an operation by a user onto the shown icon. The step of erasing the selected content may exclude an icon corresponding to any application program included in the selected content from erasure targets.

If the corresponding application program has been erased at the time when the user performs an operation onto any icon, the application program may be obtained again.

When setting of automatic erasure of a content is activated in response to an operation by the user after the step of erasing the selected content, the content may be erased regardless of an operation by the user.

An exemplary embodiment provides an information processing apparatus that includes a storage that stores a plurality of contents, a designation module that designates an amount of data, a selection module that selects at least one content from among the plurality of contents based on an amount of data designated by the designation module, and an erasure module that erases the content selected by the selection module from the storage in response to an operation by a user.

An exemplary embodiment provides an information processing system that includes a storage that stores a plurality of contents and a processing device. The processing device includes a designation module that designates an amount of data, a selection module that selects at least one content from among the plurality of contents based on an amount of data designated by the designation module, and an erasure module that erases the content selected by the selection module from the storage in response to an operation by a user.

An exemplary embodiment provides an information processing method that is performed in an information processing apparatus having a storage that stores a plurality of contents. The method includes designating an amount of data, selecting at least one content from among the plurality of contents based on the designated amount of data, and erasing the selected content from the storage in response to an operation by a user.

An exemplary embodiment provides an information processing apparatus that includes a storage that stores a plurality of contents, an acceptance module that accepts setting of automatic erasure of a content in response to an operation by a user, a selection module that sets a priority of the plurality of contents and selecting at least one content in accordance with the set priority, and an erasure module that automatically erases the at least one content selected by the selection module when setting of automatic erasure of a content is activated.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 shows an exemplary illustrative non-limiting drawing illustrating one example of a data structure of management information used in the information processing apparatus according to the present embodiment.

FIG. 13 shows an exemplary illustrative non-limiting drawing illustrating one example of a software structure implemented in the information processing apparatus according to the present embodiment.

DETAILED DESCRIPTION OF NON-LIMITING EXAMPLE EMBODIMENTS

Figure 1:
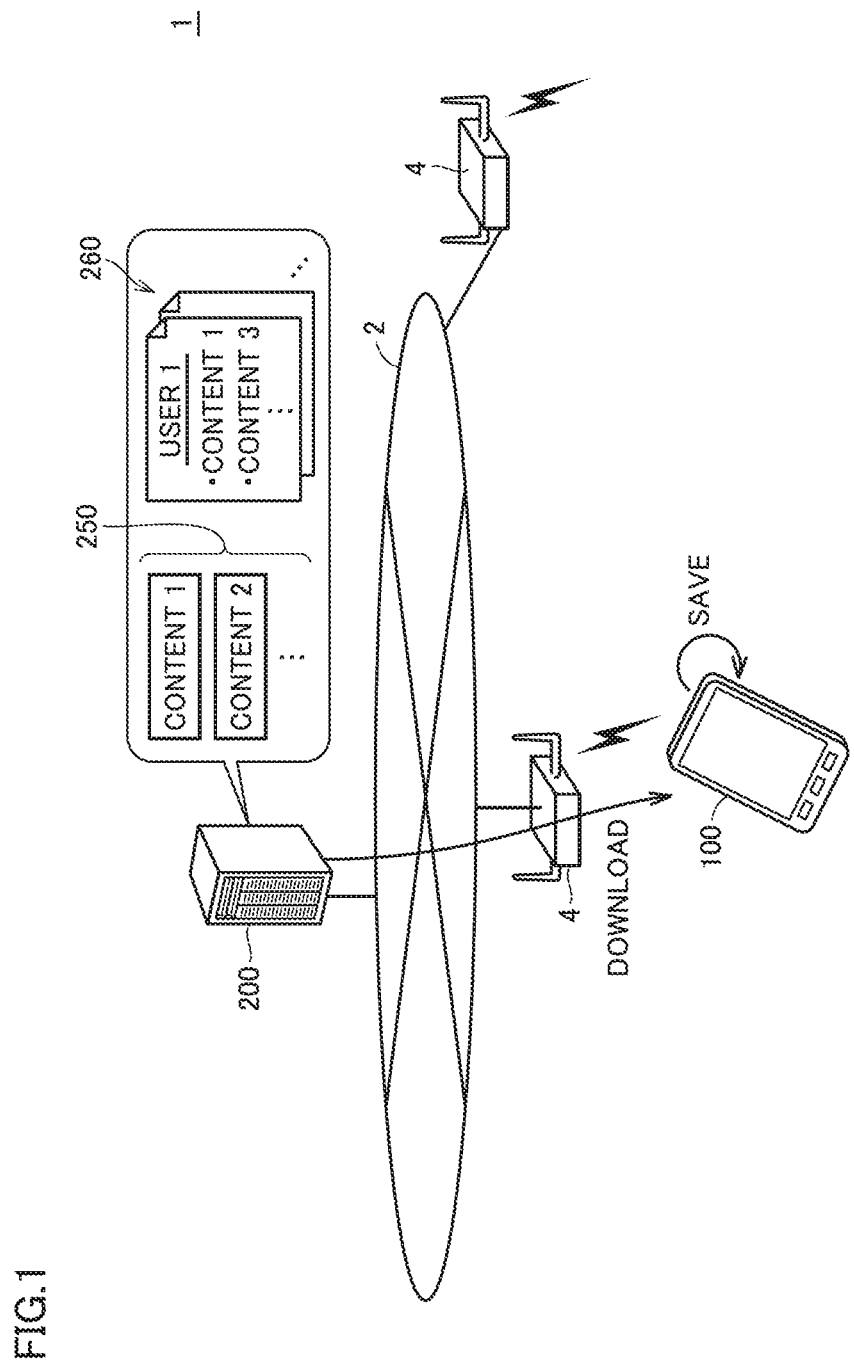
FIG. 1 shows an exemplary illustrative non-limiting drawing illustrating an overall configuration of an information processing system according to the present embodiment.

The present embodiment will be described in detail with reference to the drawings. The same or corresponding elements in the drawings have the same reference characters allotted and description thereof will not be repeated.

[A. Overall Configuration]

An overall configuration of an information processing system according to the present embodiment will initially be described with reference to FIG. 1. An information processing system 1 includes one information processing apparatus 100 or a plurality of information processing apparatuses 100 and a server 200. Information processing apparatus 100 can access server 200 through a network 2.

Network 2 may be any private network in addition to a public network such as the Internet. A communication line configuring network 2 may be a wired line or a wireless line. In the configuration shown in FIG. 1, an access point 4 is connected to wired network 2, and information processing apparatus 100 is wirelessly connected to access point 4 to access server 200 through access point 4.

Though FIG. 1 schematically depicts one server 200, one computer or an assembly of a plurality of computers may function as one server 200.

Server 200 can distribute contents to information processing apparatus 100. Specifically, server 200 includes a content group 250 consisting of a plurality of contents and management information 260.

Contents included in content group 250 include an application program providing game processing or various types of information processing, image data, moving image data, music data, and book data. In the description below, an example where a content is an application program will mainly be described.

Management information 260 includes information on which content can be distributed for each user or each information processing apparatus 100. For example, when all contents or a specific content included in content group 250 can be downloaded in accordance with a contract between a user and a content distributor, that information is reflected on management information 260.

When server 200 receives a request for distribution of a content from any information processing apparatus 100, it performs authentication processing. When the authentication processing is successful, server 200 starts downloading of the requested content. Information processing apparatus 100 saves the content downloaded from server 200 in itself.

[B. Apparatus Configuration]

A configuration of information processing apparatus 100 and server 200 configuring information processing system 1 according to the present embodiment will now be described.

(b1: Information Processing Apparatus 100)

Any computer having a storage function for storing a content from server 200 can be employed as information processing apparatus 100. Though FIG. 1 exemplifies a portable information processing apparatus by way of example, a stationary apparatus may be applicable without being limited as such. Other examples of implementations of a portable information processing apparatus include a portable telephone, a smartphone, a tablet, and a portable game device. Examples of the stationary apparatus include a personal computer and a home game machine.

Figure 2:
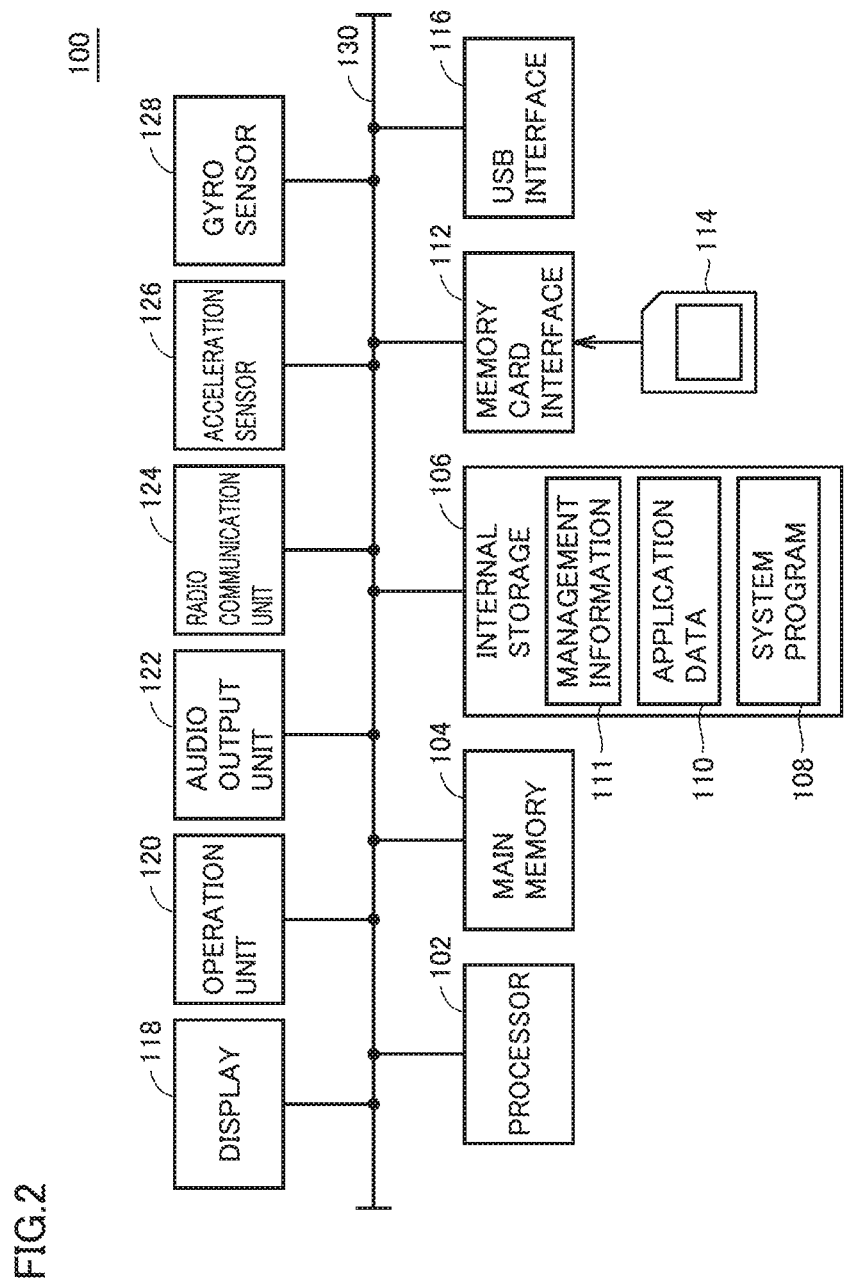
FIG. 2 shows an exemplary illustrative non-limiting drawing illustrating one example of a configuration of an information processing apparatus according to the present embodiment.

One example of a configuration of information processing apparatus 100 according to the present embodiment will be described with reference to FIG. 2. Information processing apparatus 100 includes a processor 102, a main memory 104, an internal storage 106, a memory card interface 112, a universal serial bus (USB) interface 116, a display 118, an operation unit 120, an audio output unit 122, a radio communication unit 124, an acceleration sensor 126, and a gyro sensor 128. These components are connected to be able to communicate data with one another through a bus 130.

Processor 102 is a processing entity for performing processing provided by information processing apparatus 100. Processor 102 executes a system program 108 stored in internal storage 106. System program 108 corresponds to an information processing program for implementing various functions according to the present embodiment. Processor 102 executes an application program included in application data 110 (details of which will be described later).

Main memory 104 is any storage device which can be accessed by processor 102, and mounted, for example, as a volatile storage device such as a dynamic random access memory (DRAM).

Internal storage 106 is a storage contained in information processing apparatus 100 and mounted, for example, as a non-volatile storage device such as a flash memory or a hard disk. Internal storage 106 stores one piece or a plurality of pieces of application data 110 as one example of a content downloaded from server 200 in addition to system program 108. Internal storage 106 further stores management information 111 including information on execution of one piece or a plurality of pieces of application data 110.

A memory card 114 which is a removable non-volatile storage device such as an SD card can be attached to memory card interface 112. Memory card 114 is a storage which can be attached to and removed from information processing apparatus 100. Memory card interface 112 reads data from and writes data into attached memory card 114. Memory card 114 may be used in parallel to internal storage 106. Memory card 114 may also hereinafter be referred to as an "external storage" as compared with internal storage 106.

Data similar to data stored in internal storage 106 may be stored also in memory card 114. A content downloaded from server 200 may be stored in memory card 114. At least one of internal storage 106 and the external storage (memory card 114) thus corresponds to a storage function for storing a plurality of contents.

USB interface 116 transmits and receives data to and from any external device. Yet another storage (for example, a USB memory) may be used through USB interface 116. A format for exchanging data is not limited to the USB but any parallel communication or serial communication can be employed.

Display 118 is a display which shows an image generated as a result of information processing performed by processor 102. Display 118 may show a content downloaded from server 200. A plurality of displays 118 may be provided and one display 118 or a plurality of displays 118 may be shared with another information processing apparatus 100.

Operation unit 120 mainly accepts an operation from a user of information processing apparatus 100. Operation unit 120 is mounted, for example, as an operation button, a touch panel, a mouse, or a keyboard.

Audio output unit 122 outputs voice and sound generated as a result of information processing performed by processor 102. Voice and sound generated from a content downloaded from server 200 may be output to audio output unit 122. Audio output unit 122 is mounted, for example, as one speaker or a plurality of speakers arranged at any location and an amplifier driving the speaker. Audio output unit 122 may be mounted as a connector electrically connected to a headphone and an amplifier driving the headphone connected via the connector.

Radio communication unit 124 transmits and receives data to and from another apparatus through a radio signal. Radio communication unit 124 is mounted, for example, by using a wireless local area network (LAN) under IEEE 802.11 standards, near field radio communication under Bluetooth™ standards, infrared communication, or mobile communication under long term evolution (LTD) standards. Though FIG. 2 collectively shows a block of radio communication unit 124, a plurality of types of radio communication functions may be mounted or a plurality of radio communication functions of a single type may be prepared in accordance with a communication counterpart. Radio communication unit 124 may be integrated with processor 102.

Acceleration sensor 126 is a device which detects an acceleration generated in information processing apparatus 100. Gyro sensor 128 is a device which detects inclination or the like of information processing apparatus 100.

Information processing apparatus 100 may be mounted as a combination of a plurality of independent apparatuses. For example, a first apparatus including elements corresponding to processor 102, display 118, operation unit 120, and audio output unit 122 and a second apparatus including an element corresponding to radio communication unit 124 may removably be connected to each other. If the information processing apparatus is divided into such apparatuses, it can arbitrarily be designed depending on an application and a purpose.

Alternatively, a part of functions mounted on information processing apparatus 100 may be provided by another apparatus or a plurality of other apparatuses arranged as being distributed over a network (a wide area network and/or a local network).

(b2: Server 200)

Server 200 can be implemented by a general-purpose server.

Figure 3:
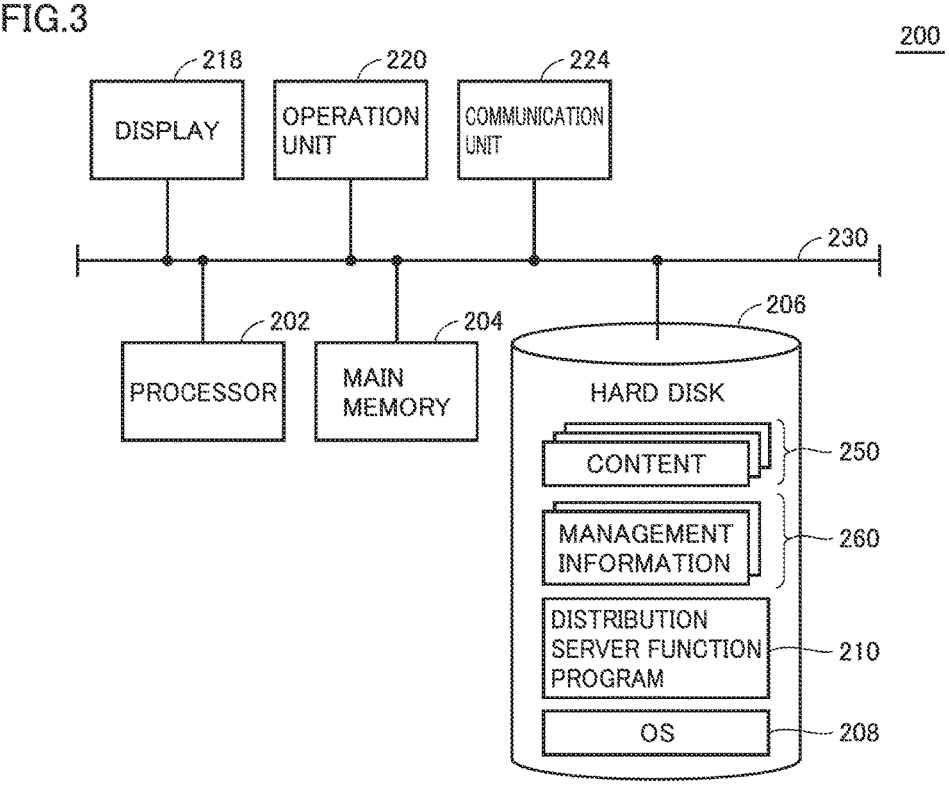
FIG. 3 shows an exemplary illustrative non-limiting drawing illustrating one example of a configuration of a server according to the present embodiment.

One example of a configuration of server 200 according to the present embodiment will be described with reference to FIG. 3. Server 200 includes a processor 202, a main memory 204, a hard disk 206, a display 218, an operation unit 220, and a communication unit 224. These components are connected to be able to communicate data with one another through a bus 230.

Processor 202 is a processing entity for performing processing provided by server 200. Processor 202 executes an operating system 208 and a distribution server function program 210 stored in hard disk 206.

Main memory 204 is any storage device which can be accessed by processor 202, and mounted, for example, as a volatile storage device such as a DRAM.

Hard disk 206 stores distribution server function program 210 for performing authentication processing or content distribution processing in addition to OS 208. Hard disk 206 also stores content group 250 consisting of a plurality of contents and management information 260. In general, since content group 250 is large in data size, a plurality of hard disks 206 can be used in coordination. Instead of or in addition to hard disk 206, a non-volatile storage device such as a solid state drive (SSD) can also be employed.

[C. Function to Support Securing of Free Space]

Information processing apparatus 100 according to the present embodiment has a function to support securing of a necessary free space when there is no sufficient free space in storing new data in internal storage 106 or memory card 114. Specifically, an automatic selection function for automatically selecting a content to be erased for securing a necessary free space and a manual selection function supporting selection of a content to be erased for securing a necessary free space are provided. Both of the automatic selection function and the manual selection function do not necessarily have to be mounted, and only any one function may be mounted. Furthermore, an automatic erasure function for automatically erasing a content selected under prescribed rules when insufficiency in free space is detected may be mounted.

An overall processing procedure in information processing system 1 according to the present embodiment will be described with reference to FIG. 4. Each step shown in FIG. 4 is typically performed as a result of execution of system program 108 by processor 102 of information processing apparatus 100.

Figure 4:
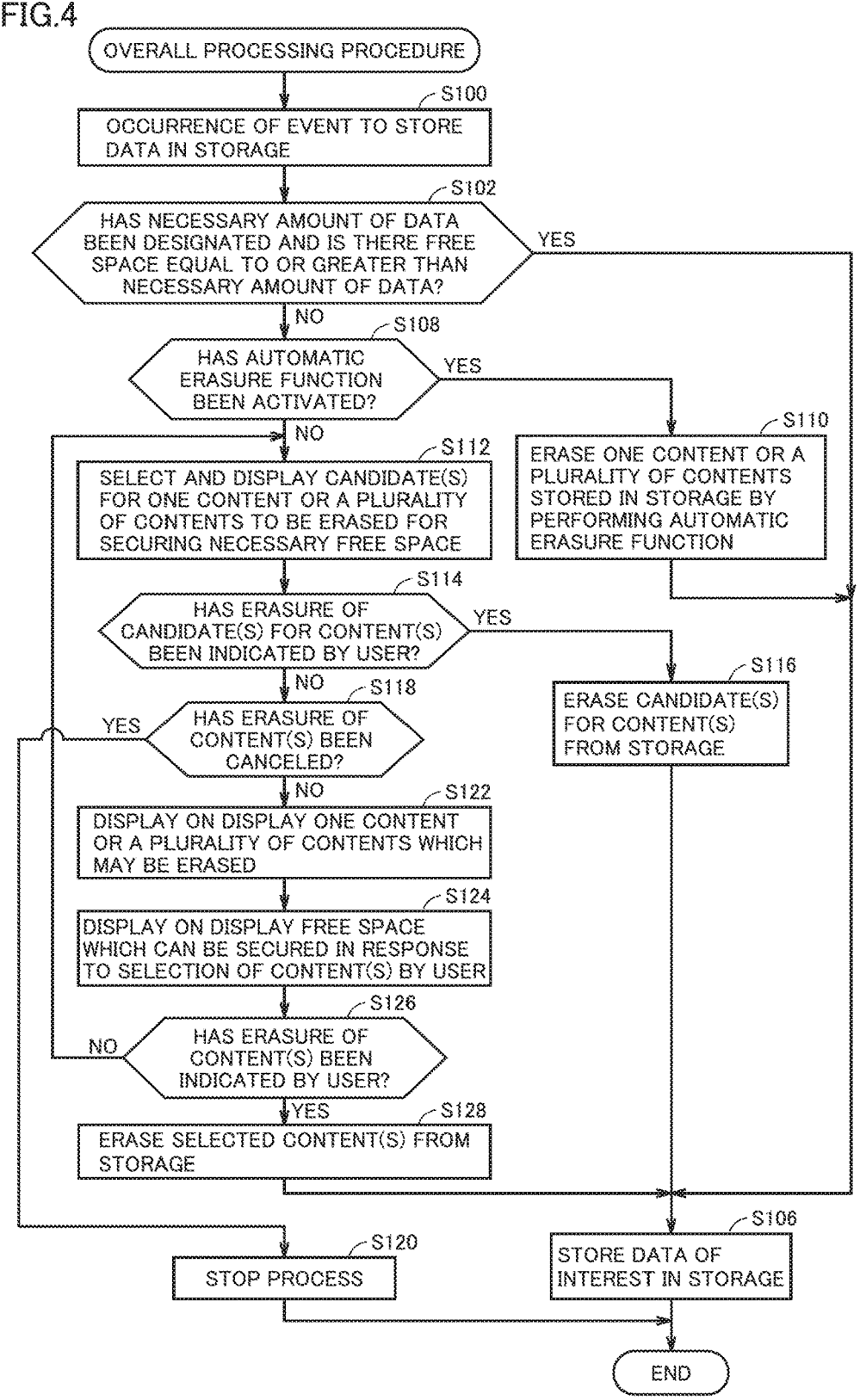
FIG. 4 shows an exemplary illustrative non-limiting drawing illustrating a flowchart showing an overall processing procedure in the information processing system according to the present embodiment.

Referring to FIG. 4, when an event to store data in internal storage 106 or memory card 114 occurs (step S100), processor 102 designates an amount of data necessary for storing the data and determines whether or not a free space equal to or greater than the necessary amount of data is available in internal storage 106 or memory card 114 (step S102).

When a free space equal to or greater than the necessary amount of data is available in internal storage 106 or memory card 114 (YES in step S102), processor 102 has the data of interest stored in internal storage 106 or memory card 114 (step S106). Then, the process ends.

When only a free space smaller than the necessary amount of data is available in internal storage 106 or memory card 114 (NO in step S102), processor 102 determines whether or not the automatic erasure function has been activated (step S108). When the automatic erasure function has been activated (YES in step S108), processor 102 performs the automatic erasure function and erases one content or a plurality of contents stored in internal storage 106 or memory card 114 (step S110). Processor 102 selects at least one content from among the plurality of contents based on the designated amount of data and erases the selected content. The designated amount of data means an amount of data calculated by subtracting a current free space from a capacity insufficient for storage of new data, that is, an amount of data necessary for storing the data (an amount of data of a content to newly be stored).

In succession, processor 102 has the data of interest stored in internal storage 106 or memory card 114 (step S106). Then, the process ends.

When the automatic erasure function has not been activated (NO in step S108), processor 102 performs the automatic selection function. Specifically, processor 102 selects a candidate for one content or candidates for a plurality of contents to be erased for securing a necessary free space from among the contents stored in internal storage 106 or memory card 114 and displays the candidate(s) on display 118 (step S112). Processor 102 selects at least one content from among the plurality of contents based on the designated amount of data. Processor 102 determines whether or not erasure of the candidate for the selected content has been indicated by a user (step S114). The designated amount of data again means an amount of data calculated by subtracting a current free space from an amount of data necessary for storing the data (an amount of data of a content to newly be stored) as described above.

When erasure of the candidate for the selected content has been indicated by the user (YES in step S114), processor 102 erases the candidate for the selected content from internal storage 106 or memory card 114 (step S116). Processor 102 erases the selected content from internal storage 106 or memory card 114 in response to an operation by the user. In succession, processor 102 has the data of interest stored in internal storage 106 or memory card 114 (step S106). Then, the process ends.

When erasure of the candidate for the selected content has not been indicated by the user (NO in step S114), processor 102 determines whether or not erasure of the content has been canceled (step S118). When erasure of the content has been canceled (YES in step S118), processor 102 stops the process (step S120).

When erasure of the content has not been canceled (NO in step S118), processor 102 performs the manual selection function. Specifically, processor 102 displays one content or a plurality of contents which may be erased on display 118 among contents stored in internal storage 106 or memory card 114 (step S122). Processor 102 displays a plurality of pieces of content information representing respective contents as being aligned in accordance with a priority for each content. A manner of representation of the content information will be described later.

Then, processor 102 has display 118 show a free space which can be secured in response to selection of a content by the user (step S124). Processor 102 performs calculation about a free space based on the designated amount of data and an amount of data of a content corresponding to content information selected by the user. Then, the result of calculation is shown on display 118.

Processor 102 determines whether or not erasure of the selected content has been indicated by the user (step S126).

When erasure of the selected content has been indicated by the user (YES in step S126), processor 102 erases the selected content from internal storage 106 or memory card 114 (step S128), and in succession, it has the data of interest stored in internal storage 106 or memory card 114 (step S106). Then, the process ends.

When erasure of the selected content has been canceled by the user (NO in step S126), the processing in step S112 or later is performed again.

Information processing apparatus 100 performs processing for supporting securing of a free space as above. Though a configuration in which the automatic selection function is performed first and then the manual selection function is consecutively performed in the processing procedure shown in FIG. 4 is exemplified, the manual selection function may be performed first. Details of the automatic selection function, the manual selection function, and the automatic erasure function shown in FIG. 4 will be described later.

[D. Data Structure of Content]

One example of a data structure of a content stored in the internal storage or the external storage of information processing apparatus 100 will now be described. In information processing apparatus 100, any application program can be downloaded from server 200 and executed.

Figure 5:
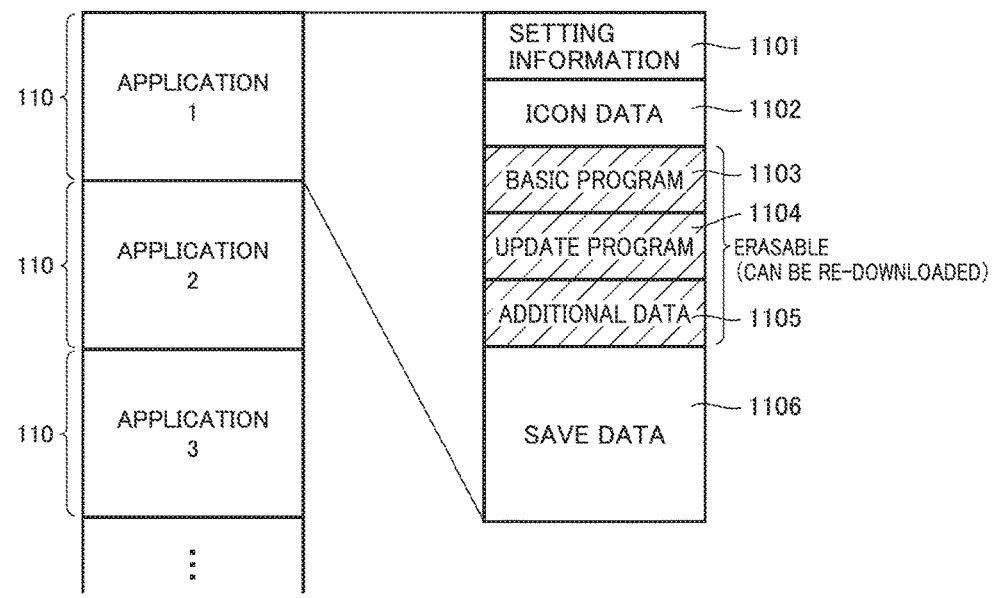
FIG. 5 shows an exemplary illustrative non-limiting drawing illustrating one example of a data structure stored in a storage of the information processing apparatus according to the present embodiment.

One example of a data structure stored in the storage of information processing apparatus 100 according to the present embodiment will be described with reference to FIG. 5. Referring to FIG. 5, the storage of information processing apparatus 100 stores application data 110 for each application program. Each piece of application data 110 typically includes setting information 1101, icon data 1102, a basic program 1103, an update program 1104, additional data 1105, and save data 1106.

Setting information 1101 includes a setting value necessary for executing a corresponding application program. Setting information 1101 includes associated information for each downloaded application program. Setting information 1101 may be downloaded from server 200 or dynamically be generated by information processing apparatus 100 in accordance with an application program downloaded from server 200.

Icon data 1102 includes an icon image for launching a corresponding application program. Basically, icon data 1102 comes with an application program downloaded from server 200. Alternatively, an icon library installed in advance in information processing apparatus 100 may be used. In this case, only identification information as to which of icons included in the icon library installed in advance in information processing apparatus 100 should be used may be included as icon data 1102.

Basic program 1103, update program 1104, and additional data 1105 shown in FIG. 5 correspond to a substance of the application program. Server 200 distributes an application program, and it may distribute basic program 1103, update program 1104, and additional data 1105 at once as being packaged or may distribute only some programs.

Basic program 1103 includes a program which is a core part of the application program. Typically, basic program 1103 includes codes of an initial version of the application program. Update program 1104 is a program generally referred to as a patch or a difference, and it fixes bugs or improves processing by being combined with basic program 1103. Additional data 1105 includes, for example, an item or a library necessary for execution of the application program. Additional data 1105 may be downloaded from server 200 as necessary during execution of the application program.

Save data 1106 includes various types of data (user data) generated as a result of execution of a corresponding application program by the user. Save data 1106 corresponds to application-associated data corresponding to the application program. Save data 1106 is generated as appropriate in response to an operation by the user.

Though FIG. 5 shows a plurality of pieces of application data 110 as being integrated for the sake of convenience of description, application data 110 may be arranged as being distributed in different storages. For example, save data 1106 may be stored in an external storage (memory card 114) and other data may be stored in internal storage 106. By storing save data 1106 in memory card 114, the same save data 1106 can be used among a plurality of information processing apparatuses 100 in which the same application program has been installed.

Once some application program is installed in information processing apparatus 100, application data 110 as shown in FIG. 5 is stored in the storage. In order to efficiently use the storage, substantial data (basic program 1103, update program 1104, and additional data 1105) of an application program low in frequency of use can also be erased. Other data of application program 110, however, remains unless information processing apparatus 100 is initialized or the application program is uninstalled. Therefore, the application program can continue to be executed from a previous state by downloading again substantial data (basic program 1103, update program 1104, and additional data 1105) from server 200 as necessary and storing the data in the storage.

An application program may automatically be erased and re-downloaded. The automatic selection function, the manual selection function, and the automatic erasure function shown in FIG. 4 are mainly applied to erasure of an application program shown in FIG. 4. Setting information 1101, icon data 1102, and save data 1106 will not be erased even when a free space is newly required.

Figure 6A:
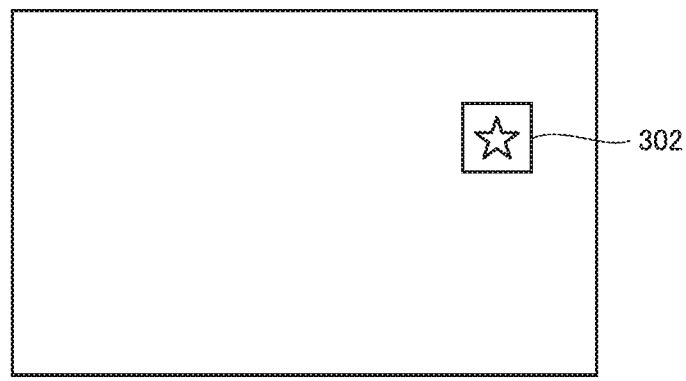
FIGS. 6A to 6C show exemplary illustrative non-limiting drawings each illustrating an example of a screen image showing a state that an application program is installed in the information processing apparatus according to the present embodiment.

FIG. 6 shows one example of a screen image showing a state that an application program is installed in information processing apparatus 100 according to the present embodiment. Referring to FIG. 6A, for example, an application program has previously been installed and an icon 302 for launching the installed application program is shown.

Figure 6B:
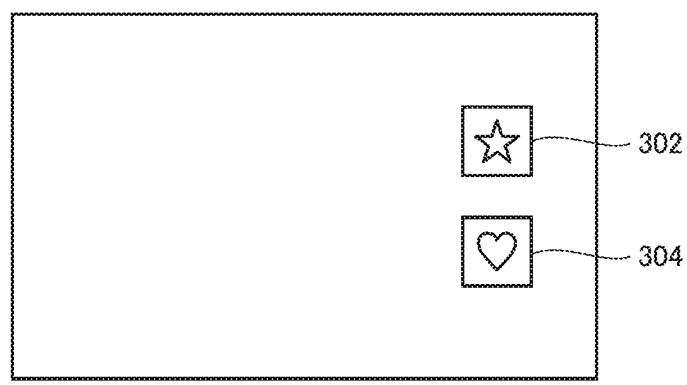

In succession, when another application program is installed, as shown in FIG. 6B, an icon 304 for launching another application program is newly shown. An icon corresponding to an application program once stored in the storage is thus shown.

In the state shown in FIG. 6B, when each of icon 302 and icon 304 is selected, each corresponding application program is executed. Thus, in response to an operation by a user onto the shown icon, a corresponding application program is executed.

Figure 6C:
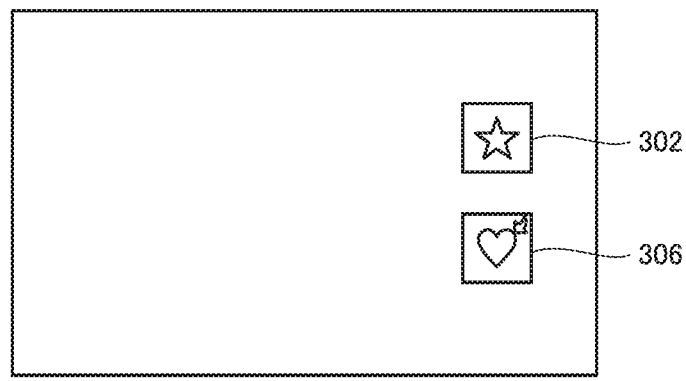

FIG. 6C shows a state after a substance of the application program corresponding to icon 304 in FIG. 6B was erased. The substance of the application program may be erased after a content (application program) is selected with the automatic selection function or the manual selection function as will be described later. Even when the application program included in the selected content is thus erased, the icon corresponding to the erased application program will not be erased.

As shown in FIG. 6C, an icon 306 slightly different in manner of representation from icon 304 in FIG. 6B may be shown. By thus making the manner of representation different, a user can know that the corresponding application program has been erased. Even though the application program has been erased, representation of the icon the same as icon 304 in FIG. 6B may be maintained.

When the user selects icon 306 shown in FIG. 6C, the substance of the corresponding application program is downloaded from server 200 and then the application program is executed. If the corresponding application program has been erased at the time when the user performs an operation on any icon, the application program is obtained again and then executed. Re-downloading of a content (application program) from server 200 is assumed as such obtainment again.

Thus, only data necessary for execution of an application program is dynamically stored in accordance with a size of a free space in the storage of information processing apparatus 100 while a state of installation of an application program is maintained. By providing such a user interface, the user can install and enjoy more application programs without concern about a capacity of the storage in information processing apparatus 100.

On the other hand, data is added to and erased from the storage in information processing apparatus 100 relatively frequently. Examples of necessity for writing new data in the storage are assumed as follows:

(1) Downloading and installation of a new application program;

(2) Obtainment again of a substantial program for executing an application program;

(3) Creation or update of save data during execution of some application program;

(4) Downloading of an additional content (information on a new item, a new character, and a new stage) during execution of some application program (see additional data 1105 in FIG. 5); and (5) Downloading and installation of an update program.

The examples described above fall under occurrence of an event of storage of data shown in step S100 in FIG. 4. In such a case, if there is no free space for storing data of interest in the storage of information processing apparatus 100, some data should inevitably be erased to secure a free space. Therefore, information processing apparatus 100 supports an operation for securing a free space by a user by providing the automatic selection function, the manual selection function, and the automatic erasure function to the user.

For example, when a new content is downloaded from server 200 connected to information processing apparatus 100 and stored in the storage, an amount of data of the content to be stored is designated as a necessary amount of data (free space). Thus, processor 102 designates an amount of data to newly be secured by erasing some data which has previously been stored, based on an amount of data of a newly stored content and a current free space in internal storage 106 or memory card 114.

[E. Automatic Selection Function]

The automatic selection function provided by information processing apparatus 100 according to the present embodiment will now be described. With the automatic selection function, a candidate to be erased among contents stored in the storage is automatically selected based on relation between data to be stored in the storage and a free space.

Figure 7:
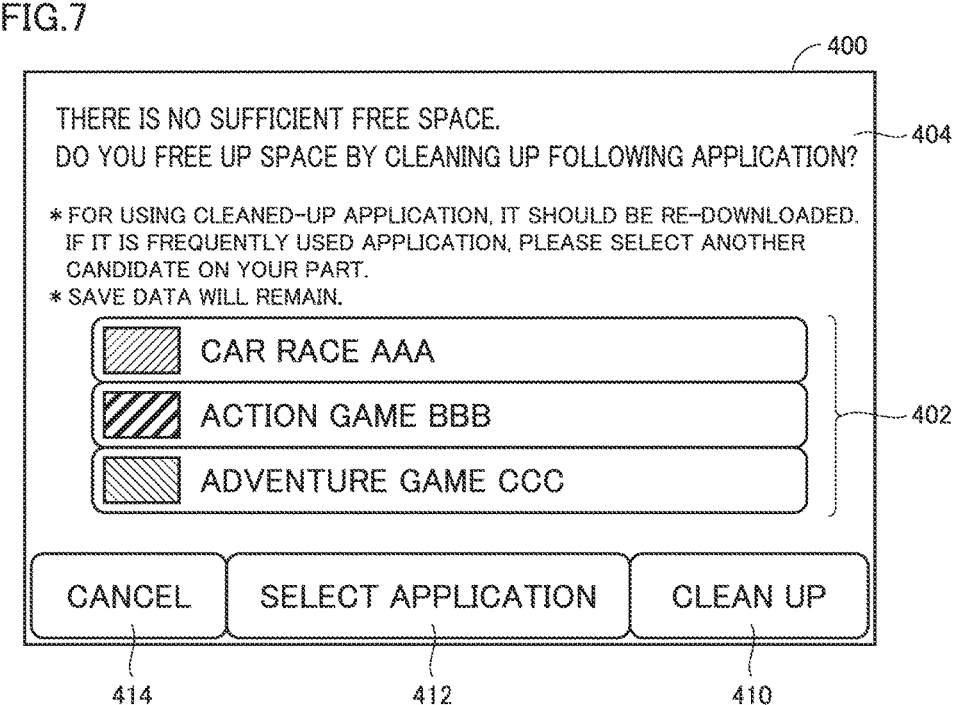
FIG. 7 shows an exemplary illustrative non-limiting drawing illustrating one example of a screen image shown in step S112 in FIG. 4.

FIG. 7 shows one example of a screen image shown in step S112 in FIG. 4. Referring to FIG. 7, a list of selected contents to be erased is shown 402 on a screen image 400 together with a message 404 "There is no sufficient free space. Do you free up space by cleaning up following application?" In the example shown in FIG. 7, three application programs have been selected as candidates to be erased.

Thus, the automatic selection function of information processing apparatus 100 selects at least one content (application program in the example shown in FIG. 7) based on the designated necessary amount of data and an amount of data of each content. The automatic selection function successively selects contents from among the plurality of contents until a total amount of data of selected contents reaches the designated necessary amount of data. Thus, the automatic selection function selects one or more contents based on an amount of data of a content to newly be stored, a current free space in internal storage 106 or memory card 114, and an amount of data of each previously stored content.

The automatic selection function of information processing apparatus 100 may automatically select an application program to be a candidate to be erased under prescribed rules. Details of the rules for selection of a candidate to be erased will be described later.

When a user selects an execution button 410 labeled as "clean up" while screen image 400 is shown, the selected content is erased from internal storage 106 or memory card 114 (see step S116 in FIG. 4).

An application program corresponding to the selected content (basic program 1103, update program 1104, and additional data 1105 shown in FIG. 5) is erased. On the other hand, other data (setting information 1101, icon data 1102, and save data 1106 shown in FIG. 5) will not be erased.

When a cancel button 414 is selected while screen image 400 is shown, processing for erasing a content for securing a free space is canceled (see step S118 in FIG. 4). When a switch button 412 labeled as "select application" is selected, the manual selection function which will be described later is performed (see step S122 in FIG. 4).

In selecting a content to be a candidate to be erased, various methods can be adopted. Management information 111 may be used for selecting such a candidate to be erased. Management information 111 may typically be stored in a system area or the like of internal storage 106.

FIG. 8 shows one example of a data structure of management information 111 used in information processing apparatus 100 according to the present embodiment. The data structure shown in FIG. 8 is by way of example and any data structure and any information to be stored may be selected.

Referring to FIG. 8, management information 111 includes a name 1111, a capacity 1112 occupied in the storage, the number of times of launch 1113 since installation, time and date of last launch 1114, a total time period of execution 1115 since installation, and exclusion information 1116 for each installed application program. A method of setting and using exclusion information 1116 will be described later.

Management information 111 may include information indicating at which position in the storage icon data 1102, basic program 1103, update program 1104, additional data 1105, and save data 1106 are stored. Details of capacity 1112 (that is, an amount of data of each of basic program 1103, update program 1104, and additional data 1105) may be managed. Management information 111 is generated at the time when a corresponding application program is downloaded and installed, and it is updated as appropriate. Basically, management information 111 will not be erased regardless of erasure of an application program.

Capacity 1112 is preferably managed for each storage which can be used by information processing apparatus 100. In the example shown in FIG. 8, a capacity is managed for each of internal storage 106 and memory card 114 (external storage).

One content or a plurality of contents to be candidate(s) to be erased is (are) selected based on an amount of data designated in accordance with an event of storage of data by using management information 111. A priority of a plurality of contents is set and at least one content is selected in accordance with the set priority. One example of a method of setting a priority for selecting a content to be a candidate to be erased is shown below.

(1) Method of Preferentially Selecting a Content Longer in Elapsed Time Since Last Launch By way of example, a priority may be set based on a state of use of each content. Specifically, with reference to time and date of last launch 1114 included in management information 111 shown in FIG. 8, contents may be selected in the descending order of a length of elapsed time since last launch until a free space to be secured is reached. As a corresponding content (application program) is earlier in last launch, a higher priority may be set therefor. Though FIG. 8 shows an example in which time and date of last launch 1114 is used, a date of last launch may be used without using time.

Thus, by preferentially selecting a content longer in elapsed time since last launch, a content lower in possibility of use is selected as a candidate to be erased, and therefore a frequency of re-downloading which will occur in the future can be reduced.

(2) Method of Preferentially Selecting a Content Smaller in Number of Times of Launch By way of example, a priority may be set based on another state of use of each content. Specifically, with reference to the number of times of launch 1113 included in management information 111 shown in FIG. 8, a content may be selected in the ascending order of the number of times of launch until a free space to be secured is reached. As a corresponding content (application program) is smaller in number of times of launch, a higher priority may be set therefor.

By thus preferentially selecting a content smaller in number of times of launch, a frequency of re-downloading which will occur in the future can be reduced.

(3) Method of Preferentially Selecting a Content Large in Data Capacity

With reference to capacity 1112 included in management information 111 shown in FIG. 8, a content may be selected in the descending order of an occupied capacity until a free space to be secured is reached. A corresponding content (application program) greater in amount of data may be higher in priority.

By thus preferentially selecting a content greater in capacity, the number of contents to be erased can be reduced and a frequency of re-downloading which will occur in the future can be reduced.

(4) Method of Preferentially Selecting a Content Shorter in Total Time Period of Execution With reference to total time period of execution 1115 included in management information 111 shown in FIG. 8, a content may be selected in the ascending order of the total time period of execution since installation until a free space to be secured is reached. A corresponding content (application program) shorter in total time period of use by the user may be higher in priority.

By thus preferentially selecting a content shorter in total time period of execution, the number of contents to be erased can be reduced and a frequency of re-downloading which will occur in the future can be reduced.

(5) Method of Selecting a Content by Using a Comprehensive Indicator

Since management information 111 shown in FIG. 8 includes a plurality of pieces of information indicating a state of use for each content, determination may be made comprehensively taking into account such information. For example, determination may be made by combining as appropriate some or all of (1) to (3) described above. Alternatively, for example, an indicator indicating a priority may be set by using a function including a weight coefficient as shown below so that a content greater in value for the set indicator is sequentially selected.

(Indicator indicating priority)=α1×(capacity)−α2× (the number of times of launch)+α3×(elapsed time since last launch)(weight coefficients α1,α2, and α3>0)

The selection methods described above are by way of example and any selection method can be adopted depending on a purpose or a state. When a capacity is managed for each storage, the same criteria may be applied to each storage and criteria different for each storage may be applied.

By adopting the automatic selection function according to the present embodiment, data to be erased for securing a free space can easily be selected when some contents should be stored in the storage of information processing apparatus 100. With such a function being provided, in using a variety of contents provided by server 200, an operation for successive changeover of necessary data can readily be performed without concern about a capacity of the storage of information processing apparatus 100.

[F. Manual Selection Function]

The manual selection function provided by information processing apparatus 100 according to the present embodiment will now be described. The manual selection function allows representation of erasable contents in a list and allows a user to arbitrarily select a content to be erased. With selection of a content by the user, the user is also notified of how much free space can be secured. The user sequentially selects contents in order to secure a necessary free space while the user refers to such a notification.

Figure 9:
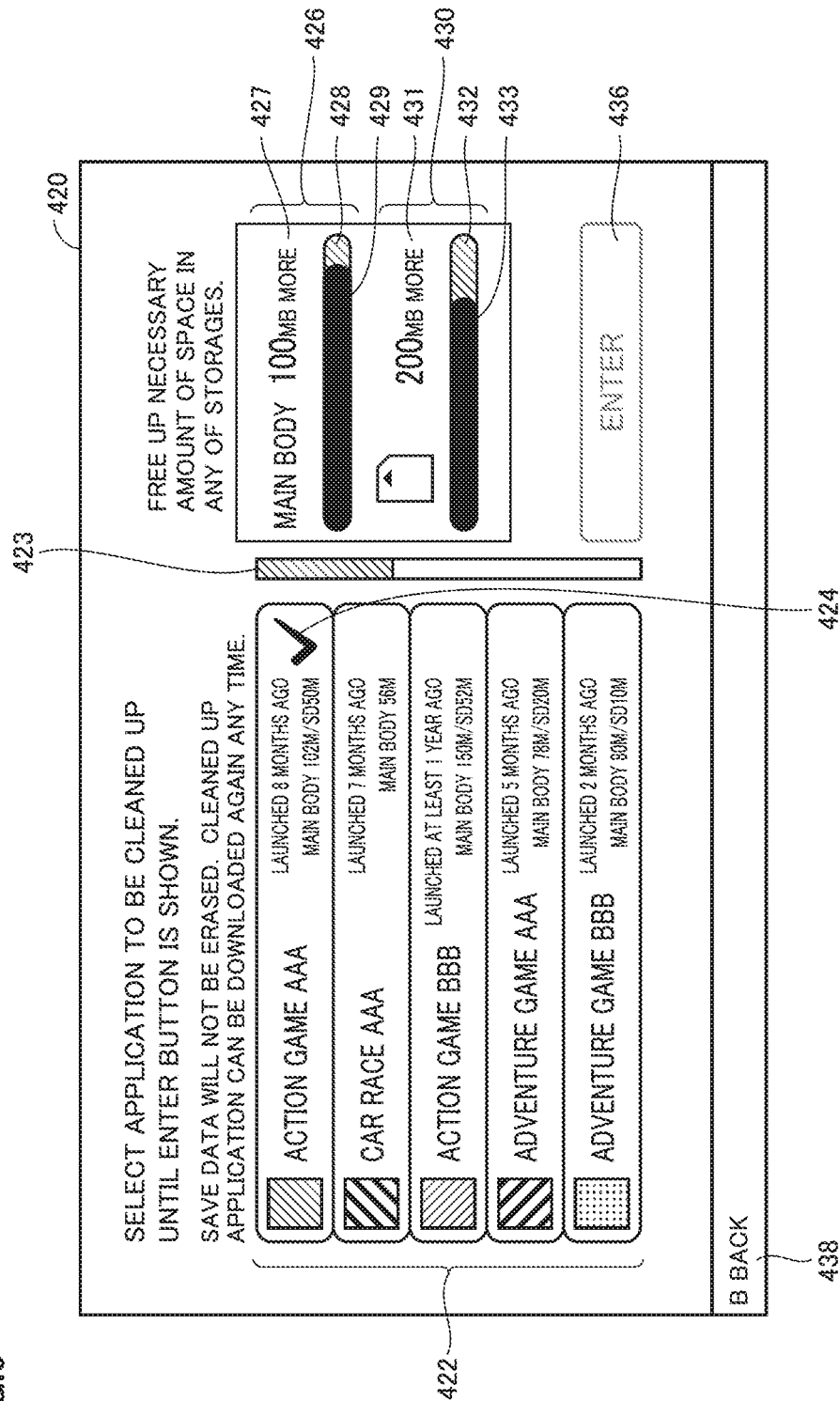
FIGS. 9 and 10 show exemplary illustrative non-limiting drawings illustrating examples of screen images shown in steps S122 and S124 in FIG. 4.
Figure 10:
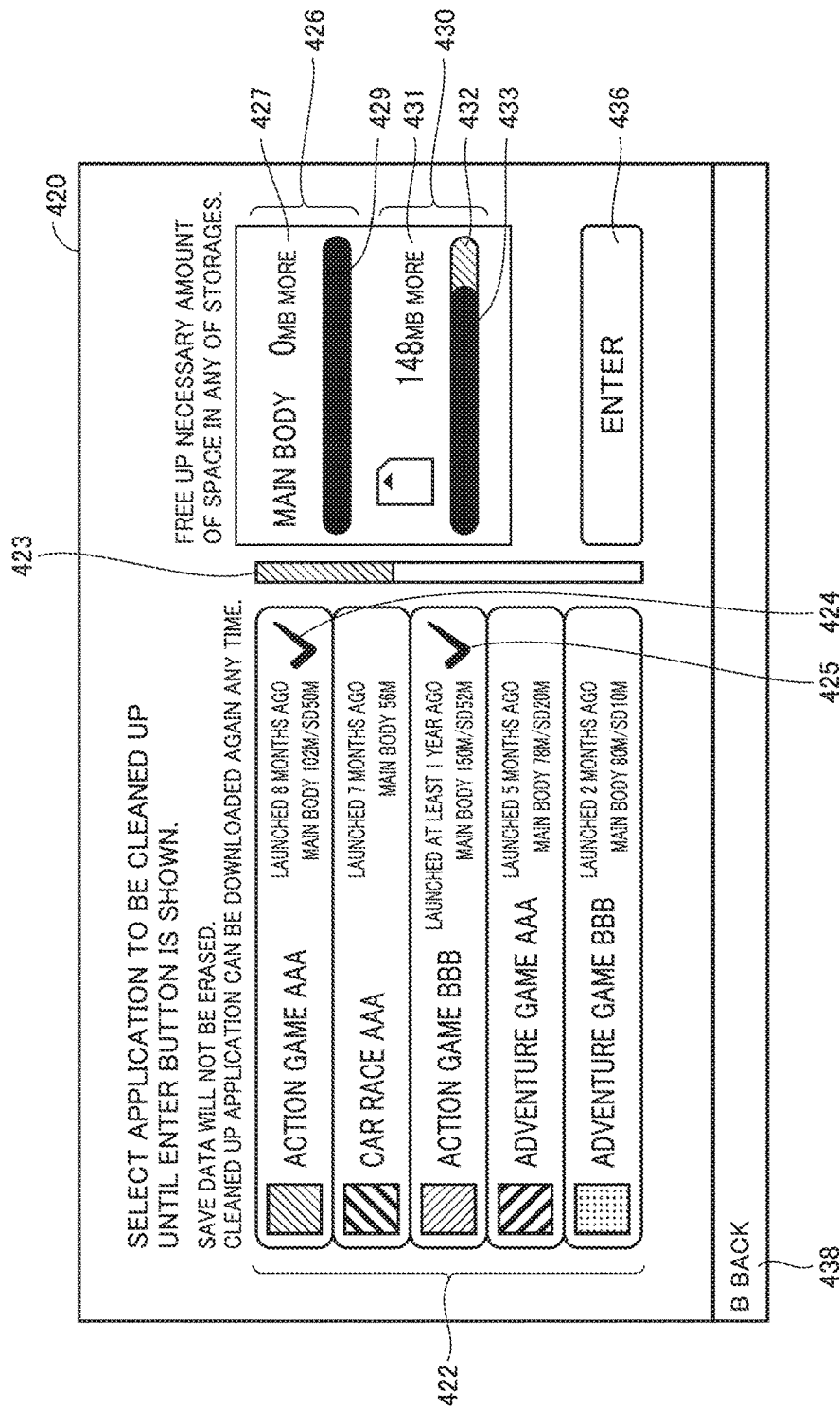

FIGS. 9 and 10 show examples of screen images shown in steps S122 and S124 in FIG. 4. The screen images shown in FIGS. 9 and 10 are typically used for showing already stored content information when there is no sufficient free space for storing a content in the storage in downloading of the content from server 200.

Referring to FIG. 9, a screen image 420 shows a content list 422 showing a list of erasable contents and shows a check mark 424 representing an image indicating a content selected from among the contents included in content list 422 as being superimposed on the content. Content list 422 includes a plurality of pieces of content information and each piece of content information represents information on a corresponding application program.

Content list 422 shown in FIG. 9 can show only five pieces of content information at once, and when there are more erasable contents, a slider 423 is shown. Details of contents shown in content list 422 are updated in response to an operation onto slider 423.

Content list 422 shows an amount of data of a corresponding application program and a state of use of the corresponding application program in addition to a name of the application program corresponding to each content. It is not necessary to show every such information, and at least one type of information may be shown. Alternatively, a type of information to be shown may be changed over time. An amount of data stored in internal storage 106 and an amount of data stored in the external storage are shown for each content as an amount of data of the corresponding application program.

Screen image 420 shows a state representation image 426 showing a free space in internal storage 106 and a state representation image 430 showing a free space in the external storage (memory card 114). Representation contents of state representation image 426 and state representation image 430 are varied depending on a content selected for erasure. In the example shown in FIG. 9, how much space is short with respect to a necessary free space is shown together. The user selects a content as appropriate in order to secure a necessary free space by referring to state representation image 426 and state representation image 430.

When a USB memory can be used through USB interface 116 (FIG. 2) in addition to internal storage 106 and memory card 114, a state representation image corresponding to the USB memory may further be provided.

Specifically, state representation image 426 includes a bar representation 428 indicating a necessary free space and a bar representation 429 indicating a free space currently secured in internal storage 106. Bar representation 429 is shown as being superimposed on bar representation 428. A numeric representation 427 shows a numeric value as to how much a currently secured free space is short with respect to a necessary free space. The numeric value shown in numeric representation 427 corresponds to a difference between a necessary free space and a currently secured free space.

Similarly, state representation image 430 includes a bar representation 432 indicating a necessary free space and a bar representation 433 indicating a currently secured free space in the external storage. Bar representation 433 is shown as being superimposed on bar representation 432. A numeric representation 431 shows a numeric value as to how much a currently secured free space is short with respect to a necessary free space. The numeric value shown in numeric representation 431 corresponds to a difference between a necessary free space and a currently secured free space.

Thus, in showing screen image 420, information processing apparatus 100 performs calculation (typically calculation of a difference) based on a designated necessary amount of data and an amount of data of a content corresponding to selected content information. A result of calculation is shown on display 118 as numeric representation 427 or numeric representation 431.

In calculation of a difference, an amount of data of a selected content can be obtained by accessing an application program stored in the storage, however, processing can be accelerated by obtaining an amount of data by referring to management information 111 (FIG. 8).

When an application program is newly downloaded, bar representation 428 and bar representation 432 indicating a necessary free space show an amount of data of the downloaded application program.

The currently secured free space means a total of a free space which has already been available in each storage before a content to be erased is selected and a free space (an expected capacity) which will be secured by erasing a selected content.

FIG. 10 shows a state that two contents have been selected for erasure. A first content with check mark 424 and a third content with a check mark 425 have been selected. With selection of two such contents, a necessary free space has been secured in internal storage 106. In state representation image 426 as well, an amount of data to further be erased is shown as "0".

When a cursor is pointed to any content in content list 422, a free space which may increase at the time when the content is selected for erasure may additionally be shown in a manner different from bar representation 429 and bar representation 433 (for example, in a different color).

When a content sufficient for securing a necessary free space in any of internal storage 106 and the external storage (memory card 114) is selected, an enter button 436 for indicating start of erasure of the selected content is activated. Enter button 436 can be selected in the state as shown in FIG. 10. When the user selects enter button 436, erasure of that content is started.

When a free space corresponding to a designated necessary amount of data can be secured by erasing a content corresponding to content information selected in content list 422 from any of internal storage 106 and the external storage (memory card 114), an operation to erase the content by the user is activated. Then, in response to an operation by the user (that is, selection of enter button 436), information processing apparatus 100 erases the content corresponding to the selected content information from the storage.

Screen image 420 shows a button 438 for canceling erasure of a content with the manual selection function, and the manual selection function is canceled based on selection of button 438 by the user.

The order of alignment of contents included in content list 422 shown in FIGS. 9 and 10 can arbitrarily be designed. Typically, contents may be shown as being aligned under the criteria as described in the automatic selection function above. Namely, (1) the method of preferentially selecting a content longer in elapsed time since last launch, (2) the method of preferentially selecting a content smaller in number of times of launch, (3) the method of preferentially selecting a content greater in data capacity, (4) the method of preferentially selecting a content shorter in total time period of execution, and (5) the selection method by using a comprehensive indicator are available.

Furthermore, the chronological order of installation or the reverse chronological order of installation may be adopted. The criteria in the automatic selection function described above do not have to be the same as the criteria in the manual selection function, and the criteria may be set for each function.

By adopting the manual selection function according to the present embodiment, the user can readily clean up contents in order to obtain a necessary free space when some contents should be stored in the storage of information processing apparatus 100. With such a function being provided, in using a variety of contents provided by server 200, an operation for successive changeover of necessary data can readily be performed without concern about a capacity of the storage of information processing apparatus 100.

[G. Automatic Erasure Function]

The automatic erasure function provided by information processing apparatus 100 according to the present embodiment will now be described. The automatic erasure function automatically performs processing for erasing a content selected by the automatic selection function described above. When some free space should be secured in the storage of information processing apparatus 100 while the automatic erasure function is active, a content is selected in accordance with a necessary free space so that the selected content is erased. The automatic erasure function may be performed as a background process or a foreground process. By adopting such a method, a necessary free space can be secured at necessary timing without bothering a user.

Figure 11:
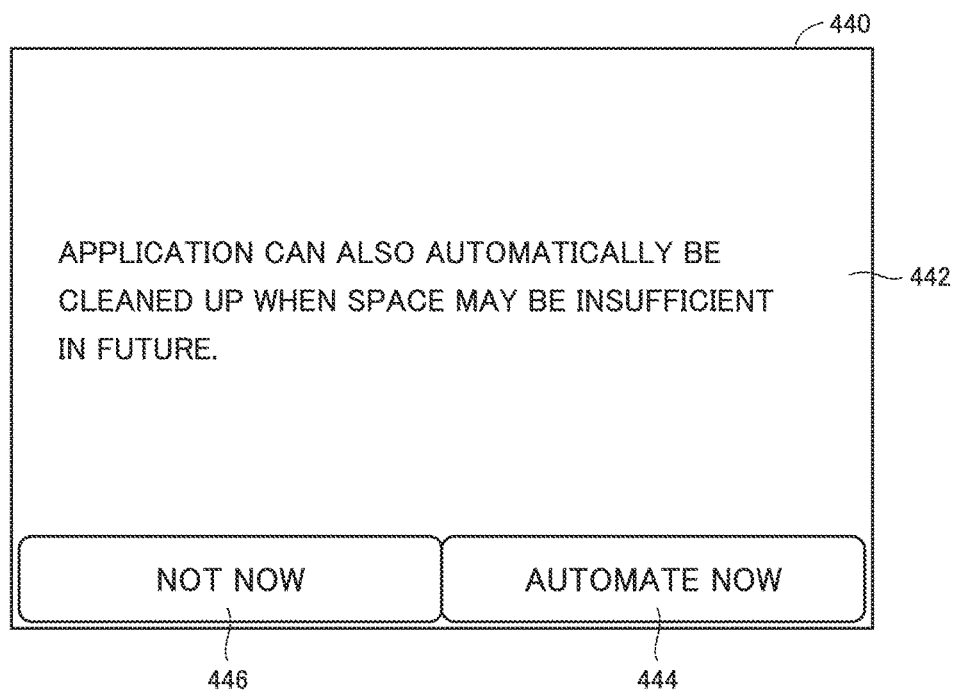
FIG. 11 shows an exemplary illustrative non-limiting drawing illustrating one example of a screen image for activating an automatic erasure function provided in the information processing apparatus according to the present embodiment.

FIG. 11 shows one example of a screen image for activating the automatic erasure function provided in information processing apparatus 100 according to the present embodiment. Referring to FIG. 11, a screen image 440 includes an activation button 444 for activating the automatic erasure function and a cancel button 446 for refraining from activating the automatic erasure function, together with a message asking whether or not to activate the automatic erasure function.

When activation button 444 is selected, the automatic erasure function is activated. When a free space should be secured, a content is automatically selected and erased. After this setting is made, basically, an interactive screen image as shown in FIGS. 7 to 10 is not shown. Setting of automatic erasure of a content is thus accepted in response to an operation by a user.

When cancel button 446 is selected, the automatic erasure function is not activated. When a free space should be secured, an interactive screen image as shown in FIGS. 7 to 10 is shown to the user.

When setting of automatic erasure of a content is thus activated in response to an operation by the user, the content is erased regardless of an operation by the user. Setting to activate the automatic erasure function may be made after the content is erased. For example, screen image 440 as shown in FIG. 11 may be shown after step S116 in FIG. 4 is performed (after a manual erasure function is performed). Alternatively, screen image 440 as shown in FIG. 11 may be shown after step S128 in FIG. 4 is performed (after the manual erasure function is performed).

Similarly to the automatic selection function described above, a priority of a plurality of contents may be set also in the automatic erasure function, and at least one content is selected in accordance with the set priority. Then, the selected at least one content is automatically erased.

The automatic erasure function according to the present embodiment may be invoked during execution of an application program. For example, the automatic erasure function is invoked when such an event as purchase of a downloaded content or saving of save data occurs during execution of an application program.

By adopting the automatic erasure function according to the present embodiment, a content is automatically selected and erased at the timing when a free space should be secured. Therefore, the user can download and enjoy any content without concern about a free space in the storage of information processing apparatus 100.

[H. Exclusion Setting Function]

There is also a content which a user does not want to be selected as a candidate for a content to be erased with the automatic selection function as described above. In such a case, a function allowing a user himself/herself to set a content which should not be erased (hereinafter also referred to as an "exclusion setting function") may be provided in advance. The exclusion setting function with which a content to be erased is set in advance will be described below.

Figure 12:
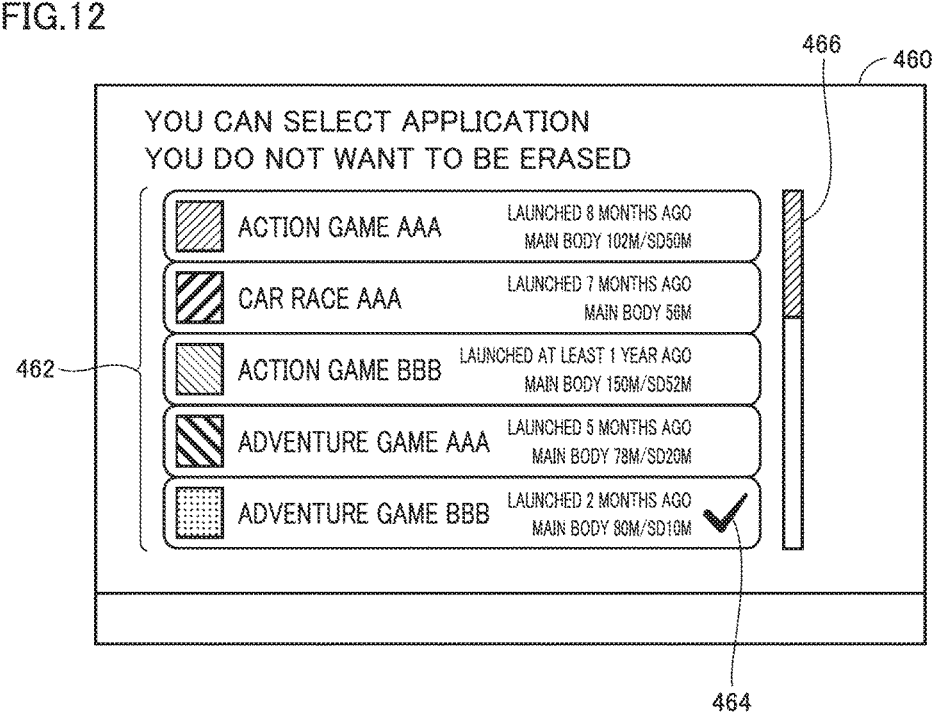
FIG. 12 shows an exemplary illustrative non-limiting drawing illustrating one example of a screen image providing an exclusion setting function of the information processing apparatus according to the present embodiment.

FIG. 12 shows one example of a screen image providing the exclusion setting function of information processing apparatus 100 according to the present embodiment. Referring to FIG. 12, a screen image 460 shows a content list 462 showing a list of contents stored in the storage. If contents more than contents which can be shown in content list 462 are stored in the storage, a slider 466 is shown so that details of contents shown in content list 462 are updated in response to an operation onto slider 466.

The user checks a content of which erasure is not desired among contents shown in content list 462. For example, when the user selects a portion indicating a content of interest, a check mark 464 is shown as being superimposed on the selected portion. The content with check mark 464 is not selected as a content to be erased in the automatic selection function and the automatic erasure function described above. Furthermore, such a content may be excluded from a candidate to be erased also in the manual selection function.

The automatic selection function of information processing apparatus 100 allows setting of an exclusion content to be excluded from erasure targets in advance among a plurality of contents, in response to an operation by the user. The automatic selection function of information processing apparatus 100 allows selection of a content to be erased from among contents other than the exclusion content among the plurality of contents.

By using such an exclusion setting function, even though the automatic erasure function as described above is activated, such a situation that a content which the user does not desire to be erased is automatically erased can be avoided.

[I. Software Structure]

A software structure implemented in information processing apparatus 100 according to the present embodiment will now be described with reference to FIG. 13.

The software structure of information processing apparatus 100 includes a software module group 150. Software module group 150 is implemented by execution of system program 108 (FIG. 2) by processor 102 of information processing apparatus 100. More specifically, software module group 150 includes a representation control module 152, a designation module 154, a calculation module 156, a selection module 158, and an erasure module 160.

Representation control module 152 generates a screen image to be shown on display 118 and performs necessary processing upon receiving an operation by a user through operation unit 120. Representation control module 152 has display 118 show a plurality of pieces of content information representing contents as being aligned in accordance with a priority for each content.

Designation module 154 designates a free space necessary for storing data when some event to store data in the storage occurs. The designated necessary free space is given to representation control module 152, calculation module 156, and selection module 158.

Selection module 158 selects one or more contents from among a plurality of contents stored in the storage based on a necessary free space (an amount of data) designated by designation module 154 when the automatic selection function or the automatic erasure function is performed. Selection module 158 selects at least one of the plurality of pieces of content information in response to an operation by the user through representation control module 152 when the manual selection function is performed.

Calculation module 156 performs calculation based on a necessary free space (an amount of data) designated by designation module 154 and an amount of data of a content corresponding to content information selected by selection module 158 when the manual selection function is performed. A result of calculation is output to representation control module 152 and representation control module 152 has display 118 show the result.

Erasure module 160 erases the content selected by selection module 158 from the storage in response to an operation by the user through representation control module 152.

[J. Additional Aspects]

The present embodiment includes an information processing apparatus as below. The information processing apparatus includes a storage that stores a plurality of application programs, an erasure module which erases an application program stored in the storage, a representation control module which has a display show an icon corresponding to the application program, and an execution module which executes, when a user selects the icon and an application program corresponding to the selected icon is stored in the storage, the application program, and obtains again, when an application program corresponding to the selected icon is not stored in the storage, the application program and executes the application program. Even after the application program is erased, the icon itself is maintained, and when that icon is selected, the erased application program is obtained again.

The present embodiment includes an information processing apparatus as below. The information processing apparatus includes a storage that stores a plurality of application programs and application-associated data (save data in the example described above) corresponding to each application program. Even when an application program is erased, the corresponding application-associated data is maintained as being stored. The information processing apparatus uses the previously stored application-associated data in execution of the application program when the application program is obtained again. Specifically, the application-associated data is read in execution of the application program.

[K. Advantages]

The information processing apparatus according to the present embodiment stores a plurality of application programs. When a new application program is downloaded, an amount of data of the application program is compared with a free space in the storage and a free space to be secured in a storage to additionally be secured is calculated. At least one application program to be erased is selected until the calculated amount of data is reached. The selected at least one application program is presented to a user. The user indicates erasure of the presented at least one application program so that a free space for storing a newly downloaded application program can be secured in the storage.

By adopting such a configuration, an operation for securing a necessary free space in newly storing any content in the storage can be facilitated.

The information processing apparatus according to the present embodiment stores a plurality of application programs. When a new application program is downloaded, an amount of data of the application program is compared with a free space in the storage and a free space to be secured in a storage to additionally be secured is calculated and shown. In addition, information representing application programs in an order in accordance with a priority is shown as being aligned. In response to a selection operation by a user, an amount of data of the selected application program is subtracted from a free space to be secured and successively shown. When the difference attains to zero, an operation for erasing the application program is permitted. Then, in response to an operation by the user, the selected application program is erased.

The storage includes an internal storage contained in the information processing apparatus and an external storage such as a memory card, and a free space to be secured is shown for each storage. By referring to such representation, a user can appropriately and readily select which application program is to be erased in order to secure a necessary free space.

By adopting such a configuration, an amount of data of an already stored content can be recognized and a content to be erased for securing an amount of data can readily be determined.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory computer-readable storage medium with an executable information processing program stored thereon, the executable information processing program, when executed by a computer of an information processing apparatus having a storage that stores a plurality of contents including a plurality of application programs, causing the computer to perform:
   controlling a display to display icons corresponding to each of the plurality of application programs;
   designating an amount of data;
   selecting at least one application program from among the plurality of application programs based on the designated amount of data; and
   erasing the selected at least one application program from the storage in response to an operation by a user, while excluding from the erasing an icon corresponding to the selected at least one application program.

2. The non-transitory computer-readable storage medium according to claim 1, wherein
   the selecting includes selecting the at least one application program based on the designated amount of data and an amount of data of each application program.

3. The non-transitory computer-readable storage medium according to claim 1, wherein
   the selecting includes successively selecting application programs from among the plurality of application programs until a total amount of data of the selected application programs reaches the designated amount of data.

4. The non-transitory computer-readable storage medium according to claim 1, wherein
   the designating includes designating the amount of data based on an amount of data of content to newly be stored and a current free space in the storage.

5. The non-transitory computer-readable storage medium according to claim 4, wherein
   the designating includes designating an amount of data of content requested to be downloaded from a server capable of connecting to the information processing apparatus.

6. The non-transitory computer-readable storage medium according to claim 1, wherein
   the designating includes selecting the at least one application program based on an amount of data of a content to newly be stored, a current free space in the storage, and an amount of data of each application program.

7. The non-transitory computer-readable storage medium according to claim 1, wherein
   the selecting includes setting a priority of the plurality of application programs and selecting the at least one application program in accordance with the set priority.

8. The non-transitory computer-readable storage medium according to claim 7, wherein
   the selecting includes setting the priority based on a state of use of each application program.

9. The non-transitory computer-readable storage medium according to claim 1, wherein the executable information processing program further causes the computer to perform:
   receiving an input selecting at least one of the application programs to be excluded as an erasure target, and
   the selecting includes excluding, as an erasure target, the at least one of the application programs to be excluded.

10. The non-transitory computer-readable storage medium according to claim 1, wherein
    the storage stores corresponding application-associated data for each application program.

11. The non-transitory computer-readable storage medium according to claim 10, wherein
    the erasing includes excluding the application-associated data corresponding to the selected at least one application program from erasure targets.

12. The non-transitory computer-readable storage medium according to claim 11, wherein
    the storage stores corresponding setting information for each application program, and
    the erasing includes excluding the setting information corresponding to the selected at least one application program from erasure targets.

13. The non-transitory computer-readable storage medium according to claim 1, wherein the executable information processing program further causes the computer to perform:
    executing an application program in response to an operation selecting an icon corresponding to the application program.

14. The non-transitory computer-readable storage medium according to claim 1, wherein the executable information processing program further causes the computer to perform:
    obtaining an application program in response to an operation selecting an icon corresponding to the application program when the application program has previously been erased.

15. The non-transitory computer-readable storage medium according to claim 1, wherein
    when setting of automatic erasure of content is activated in response to an operation by the user after erasing the selected at least one application program, the selected at least one application program is erased regardless of an operation by the user.

16. An information processing apparatus comprising:
a storage that stores a plurality of application programs and icons corresponding to each of the plurality of applications;
a display module that causes a display to display the icons corresponding to each of the plurality of application programs;
a designation module that designates an amount of data;
a selection module that selects at least one application program from among the plurality of application programs based on an amount of data designated by the designation module; and
an erasure module that erases the at least one application program selected by the selection module from the storage in response to an operation by a user, while excluding from the erasing an icon corresponding to the selected at least one application program.

17. An information processing system comprising:
a storage that stores a plurality of application programs; and
processing circuitry configured to
control a display to display icons corresponding to each of the plurality of application programs,
designate an amount of data,
select at least one application program from among the plurality of application programs based on the designated amount of data, and
erase the selected at least one application program from the storage in response to an operation by a user, while excluding from the erasing an icon corresponding to the selected at least one application program.

18. An information processing method performed in an information processing apparatus having a storage that stores a plurality of contents including a plurality of application programs, the method comprising:
controlling a display to display icons corresponding to each of the plurality of application programs;
designating an amount of data;
selecting at least one application program from among the plurality of application programs based on the designated amount of data; and
erasing the selected at least one application program from the storage in response to an operation by a user, while excluding from the erasing an icon corresponding to the selected at least one application program.

19. A non-transitory computer-readable medium including computer-program instructions, which when executed by an electronic device including a storage that stores a plurality of application programs and icons corresponding to each of the plurality of application programs, cause the electronic device to:
control a display to display the icons corresponding each of the plurality of application programs;
designate an amount of data;
select at least one application from the plurality of applications to be erased from the storage based on the designated amount of data; and
erase the selected at least one application program from the storage, while excluding from the erasing an icon corresponding to the selected at least one application program.

20. The apparatus according to claim 19, wherein
the circuitry is configured to acquire, after the selected at least one application program has been erased from the storage, the selected at least one application program from a server remote from the apparatus in response to receiving an input selecting the icon corresponding to the selected at least one application program.

21. An information processing apparatus comprising:
a storage configured to store a plurality of application programs and icons corresponding to each of the plurality of applications; and
circuitry configured to
cause a display to display the icons corresponding to each of the plurality of application programs;
designate an amount of data;
select at least one application program from among the plurality of application programs based on the designated amount of data; and
erase the selected at least one application program from the storage in response to an operation by a user, while excluding from the erasing an icon corresponding to the selected at least one application program.

* * * * *